L. ATWOOD.
HOSE COATING APPARATUS.
APPLICATION FILED JULY 2, 1919.
1,366,342.
Patented Jan. 25, 1921.
2 SHEETS—SHEET 1.
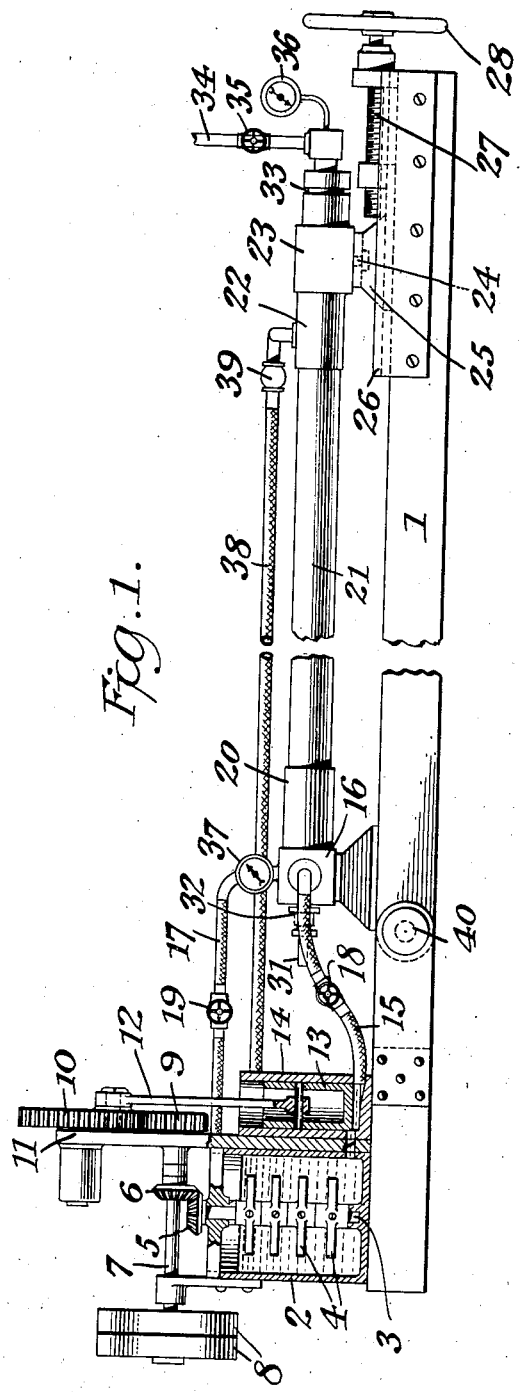
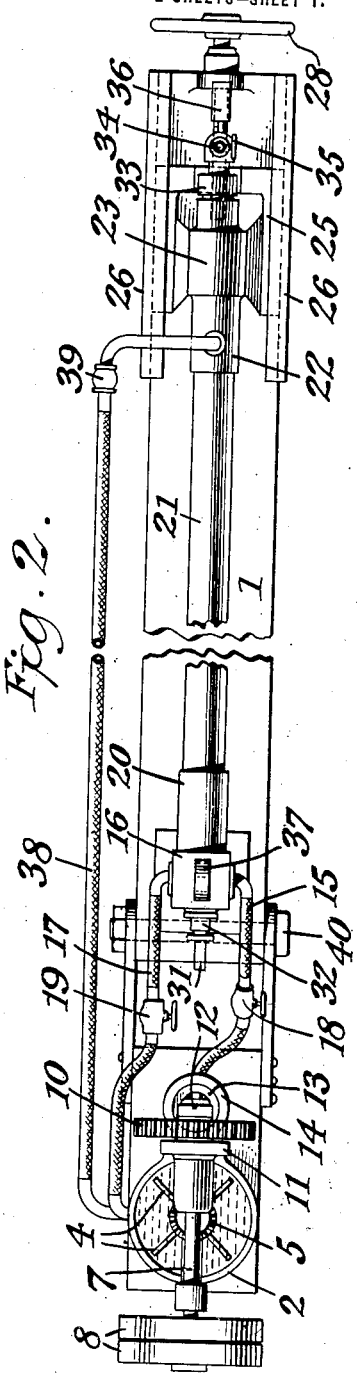
Inventor
Leonard Atwood
By his Attorney
A. B. Upham L. ATWOOD.
HOSE COATING APPARATUS.
APPLICATION FILED JULY 2, 1919.
1,366,342.
Patented Jan. 25, 1921.
2 SHEETS—SHEET 2.
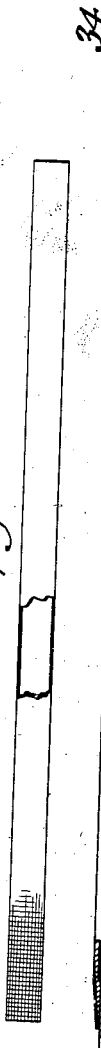
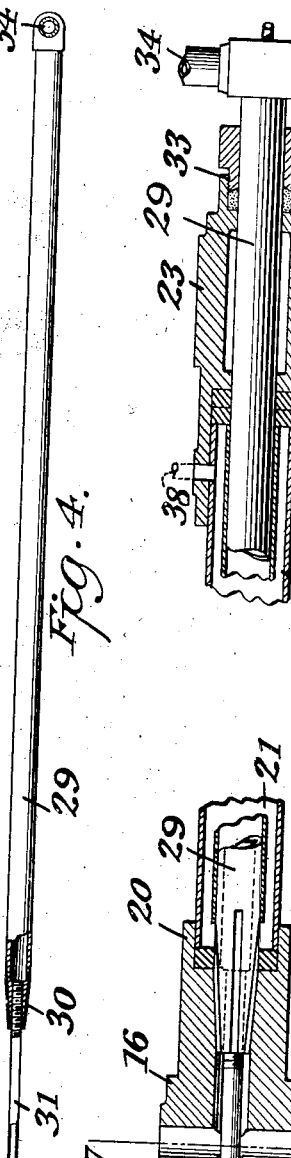
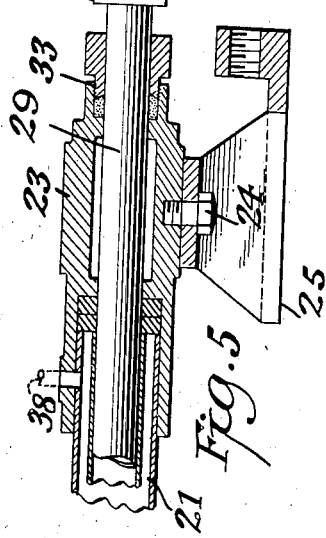
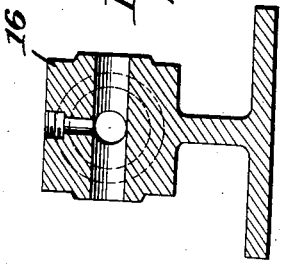
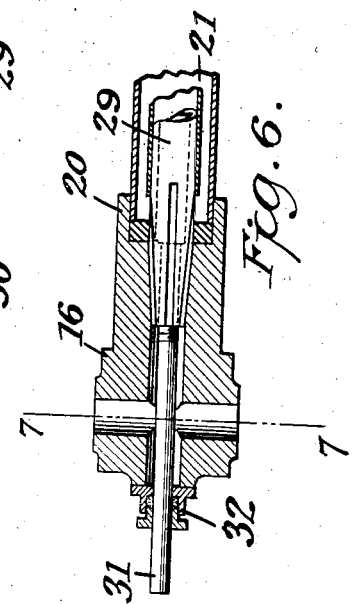
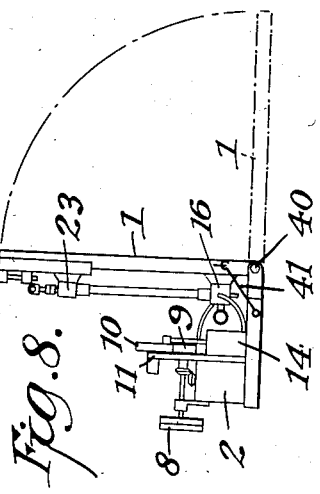
Inventor
Leonard Atwood
By his Attorney

UNITED STATES PATENT OFFICE.

LEONARD ATWOOD, OF BOSTON, MASSACHUSETTS.

HOSE-COATING APPARATUS.

1,366,342.  Specification of Letters Patent.  Patented Jan. 25, 1921.

Application filed July 2, 1919. Serial No. 308,626.

*To all whom it may concern:*

Be it known that I, LEONARD ATWOOD, a citizen of the United States, residing at Boston, Suffolk county, Mass., have invented a new and useful Improvement in Hose-Coating Apparatus, of which the following is a specification.

This invention has for its primary object an improved coating apparatus for use in treating hose or other tubular structures that are round or circular in cross section and formed either entirely of fabric or of metal or a combination of textile fabric and metal constituting a composite structure.

The invention aims to so treat the woven structure that it will be air, steam and water-tight, by filling the interstices between the strands or cords composing the weave or the woven walls constituting the woven structure, with a suitable liquid filler possessing plastic properties, the same being forced under high pressure through the weave or walls of the tubular structure, the latter being subjected to heat during or after the filling operation.

The invention also has for its object a coating apparatus of this character, the parts of which are so constructed and arranged that the pressure on the liquid filler may be continued after the heat has been applied, so as to compensate for or provide against leakage or shrinkage.

A still further object of the invention is an apparatus of this character which will result in molding the woven structure in a smooth and uniform shape, with walls of uniform thickness and of uniform strength throughout.

The invention also has for its object an apparatus of this character, the parts of which are so constructed and arranged that all sagging of the mandrel and encircling casing, between the spaced walls of which the tubular structure is received, is prevented, and to this end or purpose, the preferred embodiment of the invention includes a casing and mandrel which may be maintained either in a horizontal or in a vertical position, according to the particular requirements of the case.

And the invention also aims to generally improve this class of devices and to render them more useful and commercially desirable.

With these and other objects in view, as will more fully appear as the description proceeds, the invention consists in certain constructions, arrangements and combinations of the parts that I shall hereinafter fully describe and claim.

For a full understanding of the invention, reference is to be had to the following description and accompanying drawing in which, Figure 1, is an elevation, partly in section of my improved coating apparatus.

Fig. 2, is a plan view of the construction shown in Fig. 1.

Fig. 3, is a side view of a length of textile tubular fabric such as is treated to render the same air, steam and water-tight, Fig. 4, is a side view partly in section of a tubular mandrel adapted to receive a heating medium, such as steam.

Fig. 5, is a sectional view, on an enlarged scale of one end of the mandrel and its supporting head.

Fig. 6 is a sectional view also on an enlarged scale, showing the opposite end of the mandrel and its supporting head.

Fig. 7 is a detail cross section taken on the line 7—7 of Fig. 6, and:—

Fig. 8 is a side view of the coating apparatus on a greatly reduced scale, showing the position of the parts during the last step in the operation of treating or molding a tubular textile fabric.

Corresponding and like parts are referred to in the following description and designated in the accompanying drawing by like reference characters.

My improved coating apparatus includes a base 1, upon one end of which is mounted a tank 2 designed to contain the liquid filler which may be of any desired character. Preferably, the tank or reservoir 2 contains an agitating device which, in the present instance, is in the form of a vertically disposed spindle 3 mounted in a step bearing at the bottom of the tank and provided with any desired number of agitating blades or arms 4. The upper end of the spindle 3 is provided with a bevel pinion 5 which meshes with a corresponding pinion 6 on a horizontally disposed drive shaft 7, said shaft being driven in any desired way, and, in the present instance, being provided with fast and loose pulleys 8, around which a belt or band may be passed. A spur pinion 9 is secured to one end of the shaft 7 and meshes with a spur gear wheel 10 carried by a shaft journaled in the upper end of a standard 11. A pitman or connecting rod 12 is eccentrically connected at one end to the face of the gear wheel 10 and is connected at its other end to a piston 13 which is mounted for reciprocation in the cylinder 14 of a powerful force pump operatively connected to the tank 2.

The force pump has its outlet port connected to a preferably flexible pipe 15 which leads to and opens into a distributing head 16 mounted on the base 1. A by-pass pipe 17, also preferably flexible, is connected to the head 16 at an opening leading laterally therefrom and leads back into the combined agitator and supply tank 2. Both pipes 15 and 17 are provided with regulating valves or cocks, the same being designated 18 and 19, respectively.

The distributing head 16 is formed at one end with a longitudinally extending packing sleeve 20 designed to receive and hold one end of a tubular casing 21. The other end of said casing is designed to be received and held in a longitudinally extending packing sleeve 22 formed on a movable head 23 which is mounted for an axial movement, as at 24, on a slide plate 25 which is movable longitudinally on the base 1 in guide-ways 26. The slide plate 25 may be adjusted longitudinally on the base 1 by any desired means, as, for instance, by a powerful adjusting and compression screw 27 provided at one end with a hand wheel 28.

29 designates the hollow mandrel of the apparatus. This mandrel is provided at one end with a tapered plug 30 designed to fit within the correspondingly formed inner wall of the packing sleeve 20 of the distributer head 16, the plug being formed with any desired number of exterior longitudinally extending grooves to permit the liquid filler to flow therethrough into the space between the exterior wall of the mandrel and the interior wall of the casing. The plug is also formed with a longitudinal opening extending therethrough, from which a vent pipe 31 extends, said pipe projecting through the head 16 and a stuffing box 32 formed thereon or secured thereto and being designed to discharge the steam and water of condensation from the mandrel 29. The other end of the mandrel 29 passes through a stuffing box 33 formed on the head 23 and is formed at such end with connections for a steam supply pipe 34 controlled by a valve or cock 35 which is preferably manually operable. 36 and 37 designate pressure indicating gages which are secured to the mandrel 29 or steam pipe 34, and by-pass pipe 17, respectively.

If desired, I may provide a "telltale" or by-pass pipe 38 which is preferably flexible and which opens at one end into the packing sleeve 22 and at its other end into the tank 2, whereby the operator may ascertain whether or not the liquid is flowing entirely through the apparatus. The by-pass pipe 38 is provided with a hand operated valve 39 which may be located at any point therein.

From as much of the description as has preceded in connection with the accompanying drawings, the operation of my improved coating apparatus for treating hose or other tubular structures, will be apparent. In the practical use of the device, the woven structure to be treated in short or relatively moderate lengths, is placed over the mandrel 29 by drawing it thereon, and the casing 21 is then drawn over the tubular structure, and the casing and mandrel are then placed in position, the vent pipe 31 passing through the head 16, the plug 30 of the mandrel snugly fittting in the tapered packing sleeve 20, and the slide plate 25 is backed off far enough to permit the casing 21 to be received in the packing sleeve 22. The plate 25 is then moved forwardly again so that the casing will be held firmly between the two heads, the packing sleeves 20 and 22 being compressed upon the ends of the casing by the compression screw 27, and such compression being subsequently increased by the expansion of the metal when the apparatus is heated. After the mandrel has passed through the stuffing box 33, the latter is made tight and the steam connection is then made and a small quantity of steam turned on to test for leakage and to warm the apparatus. The force pump is then put in operation and the liquid by-passed to the agitator and supply tank 2, and after the liquid has been thoroughly incorporated, the valve 19 in the by-pass pipe 17 is closed to a point to insure sufficient pressure to force the liquid through the woven or other tubular structure. Steam is then turned into the mandrel and the curing or vulcanizing follows. As the mass hardens, the force pump will return all the unused liquid through the by-pass pipe 17 to the tank 2.

It is manifest that in treating long lengths of tubular structures if the mandrel 29 should sag or become deflected in any way between the heads 16 and 23, the completed or treated structure would be liable to be weak at one or more points or not possess walls of uniform strength and thickness throughout. To positively insure against this contingency, I preferably construct the base 1 in two sections pivotally connected together at the point 40, whereby if desired, the relatively long section carrying the distributing heads and other component parts of the apparatus may be held in a true vertical position, as best illustrated in Fig. 8. Any suitable construction of braces 41 or the like may be used for this purpose. When in a vertical position, it will be understood that all tendency of the mandrel to sag will be entirely eliminated. This capability of adjustment will also be found useful not only for the purpose of avoiding any sagging of the mandrel, but in case it is desired to treat relatively long lengths of hose or other tubular structures in places where it is desired to economize floor space, in which event, the apparatus could be run vertically through hatch-ways in two or more consecutive floors. It is to be understood, however, that my invention is not limited in this regard.

After the curing or vulcanizing has been completed, the head 23 is backed off and the casing and mandrel removed and the process repeated. It is to be understood that any desired number of lengths may be treated at the same time by duplicating the passages in the heads and employing a plurality of sets of casings, mandrels and other correlated parts.

While the accompanying drawings illustrate what I believe to be the preferred embodiment of my invention, it is to be understood that the invention is not limited thereto, but that various changes may be made in the construction, arrangement and proportions of the parts without departing from the scope of the invention, as defined in the appended claims.

What I claim is:—

1. A coating apparatus of the character described, including a tubular casing, a tubular mandrel mounted therein, the walls of the casing and mandrel being spaced from each other, a force pump operatively connected to the casing and adapted to force liquid under pressure into the space between the casing and mandrel, a supply pipe for said pump, and an agitator mounted in said tank.

2. A coating apparatus of the character described, including a tubular casing, a tubular mandrel mounted therein, the walls of the casing and mandrel being spaced from each other, means for forcing a liquid compound under pressure into the space between said mandrel and casing, and means for passing steam through the mandrel.

3. A coating apparatus of the character described, including a tubular casing, a tubular mandrel mounted therein, a distributing head formed with a packing sleeve adapted to receive and hold one end of the casing, the mandrel being formed with a tapering plug and the sleeve being formed with a tapering socket receiving said plug, the plug being formed with exterior longitudinal grooves, an adjustable head provided with a packing sleeve adapted to receive the other end of the casing, means for forcing a liquid under pressure into the casing, and means for passing steam through the mandrel.

4. A coating apparatus of the character described, including a base embodying sections hingedly connected together, whereby one section may be swung to a vertical or to a horizontal position, a force pump mounted on the other section of the base, a source of supply for said force pump, a tubular casing mounted on and carried by the movable section of the base, a tubular mandrel mounted in said casing, the walls of the casing and mandrel being spaced from each other, a flexible pipe leading from the pump to the interior of the casing, means for passing steam through the mandrel, and a flexible by-pass pipe leading back from the casing into the supply for the pump.

5. A coating apparatus of the character described, including a tubular casing, a tubular mandrel mounted therein, a tank for containing a liquid filler, a pump adapted for receiving the liquid filler from said tank, means connecting said pump and tubular casing for enabling the pump to force the liquid filler into said casing, and means connecting said tubular casing and tank to enable the liquid filler to be forced back from said casing to said tank.

6. A coating apparatus of the character described, including a base, a tubular casing supported by said base, an open tank supported by said tank for containing a liquid filler, a vertical agitator shaft having agitator arms rotatable in said tank, a force pump supported by said base adjacent said tank, a conduit between the lower ends of said tank and pump, a check valve for preventing the return of liquid from the pump to the tank, power means for operating said agitator shaft and pump, a pipe connecting said pump and tubular casing, and a pipe connecting said tubular casing and tank.

In testimony that I claim the foregoing invention, I have hereunto set my hand this 23rd day of June, 1919.

LEONARD ATWOOD.